Patented Nov. 21, 1933

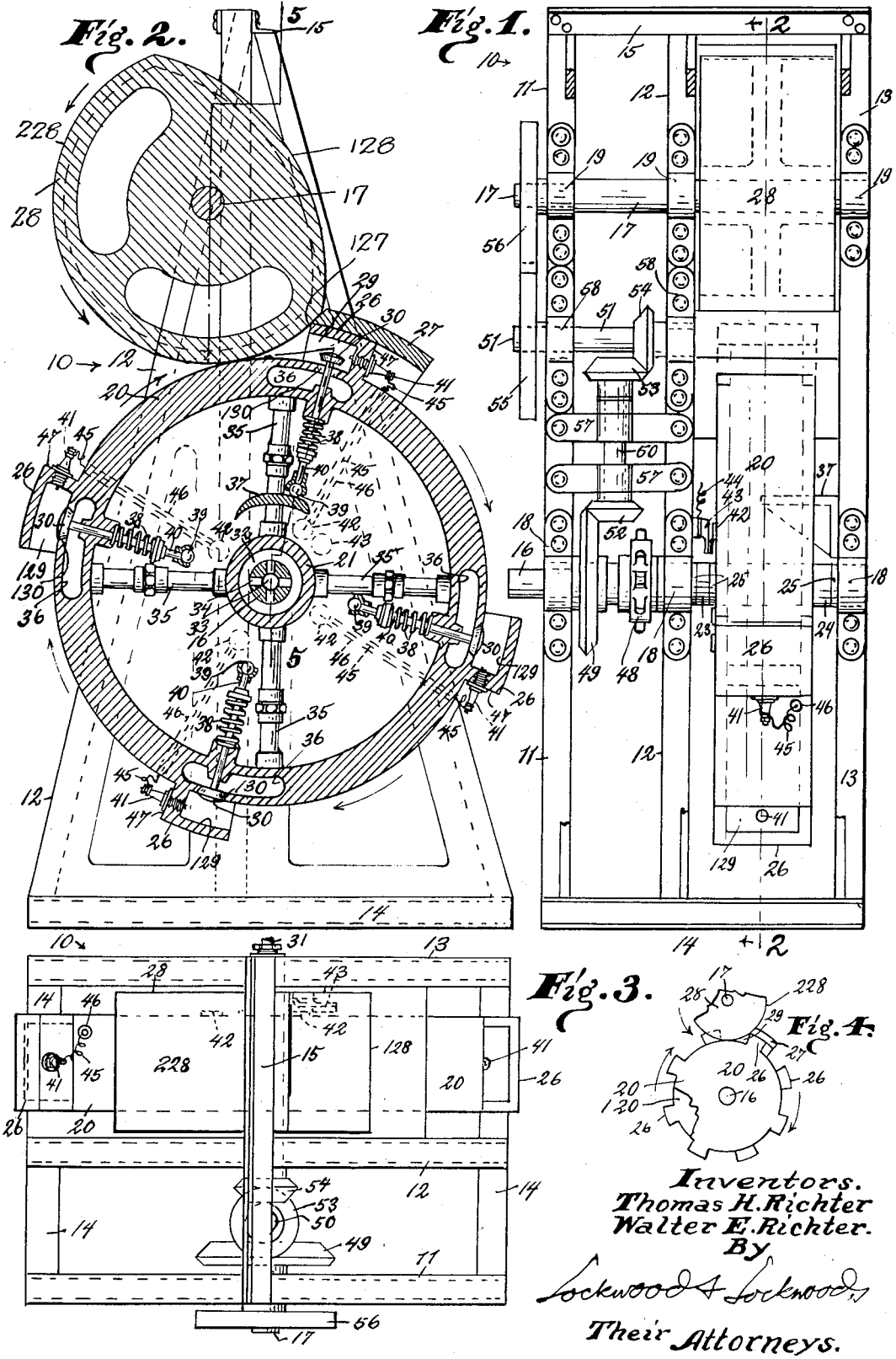

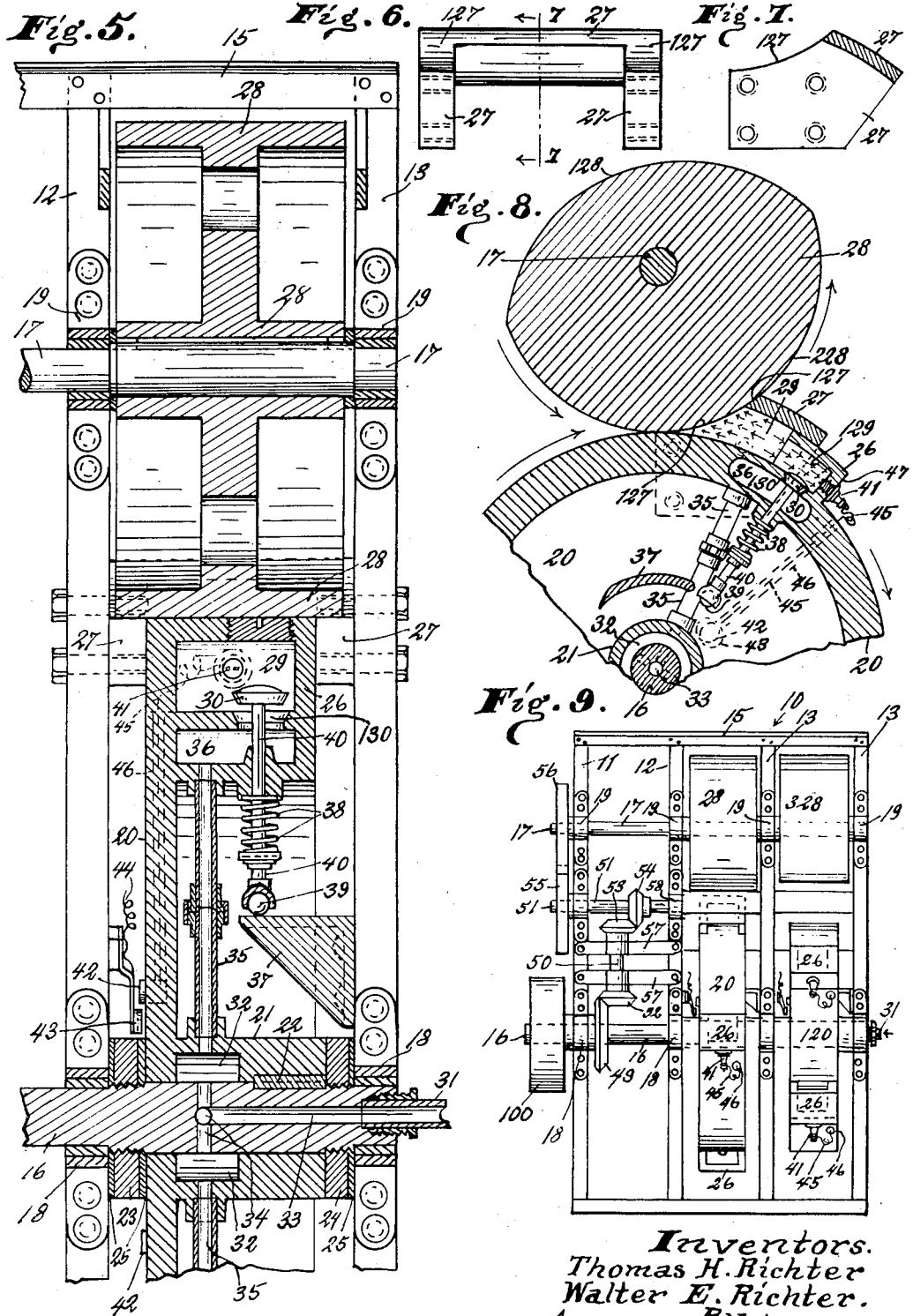

1,936,211

UNITED STATES PATENT OFFICE 1,936,211

ROTARY INTERNAL COMBUSTION ENGINE

Thomas H. Richter and Walter E. Richter, Los Angeles, Calif.

Application January 19, 1931. Serial No. 509,650

4 Claims. (Cl. 123—13)

This invention relates to an improvement in the construction and operation of rotary internal combustion engines, and the principal object is to develop great power wth a relatively small consumption of fuel. To that end we provide an engine having a power wheel with combustion chambers on its rim at a great radial distance from the center of the power wheel shaft so that substantially all the thrust power from combustion is transmitted through the long radial leverage to the power shaft. In other words the parts of the engine are constructed and arranged so that the power taken off the drive shaft is about four times as great as the thrust power of combustion at the rim of the power wheel.

A feature of invention is shown in constructing the engine power wheel so it also functions as a fly wheel. This feature is accomplished by providing the power wheel with a relatively heavy rim, which when set in motion acts as a fly wheel to aid greatly in imparting rotary power to the engine shaft. It is understood that power developed by the engine can be utilized for driving machines, vehicles and the like.

Other objects, advantages and features of invention may appear from the accompanying drawings, the subjoined detailed description and the appended claims.

The accompanying drawings illustrate the invention, in which:

Figure 1 is an end view of a rotary internal combustion engine constructed in accordance with this invention and diagrammatically indicating a gear connection between the revolving abutment and the power wheel. Fig. 2 is an enlarged vertical section on line 2—2, Fig. 1, showing one of the power units on the rim of the power wheel nearing the end of its intake or charging period and the other units idle, parts indicated diagrammatically. Fig. 3 is a plan view of the engine drawn to the same scale as Fig. 1 with some parts indicated diagrammatically. Fig. 4 is a fragmental side view of the engine when comprising two power wheels shown diagrammatically and parts omitted. Fig. 5 is an enlarged fragmental section on the staggered line 5—5, Fig. 2, showing in detail the means for charging the combustion chamber. Fig. 6 is an end view of one member of the combustion chamber housing detached from the engine frame. Fig. 7 is a central vertical section on the line 7—7, Fig. 6. Fig. 8 is an enlarged fragmental view analogous to the upper portion of Fig. 2, showing the power wheel advanced beyond the intake period, the inlet valve closed and the charge ignited. Fig. 9 is an end view of an engine analogous to the engine shown in Fig. 1 with an additional power wheel and abutment and the combustion chambers of the latter wheel arranged at a forty-five degree angle relative to the chambers of the first wheel.

The engine can be mounted in any suitable way. It includes the frame 10 that is formed of the upward extending frame members 11, 12 and 13 that are spaced apart and secured on the base 14 and their top ends secured by the angle iron 15.

A drive shaft 16 and driven shaft 17 are mounted on these frame members by the bearing straps 18 and 19 as diagrammatically indicated in Figs. 1, 5 and 9. The shaft 16 supports the combined power and fly-wheel 20 that has its hub 21 secured to the shaft by a key 22, see Fig. 5, and the hub is secured from endwise movement by the opposing nuts 23 and 24 and spacing rings 25.

The rim of the fly-wheel is relatively thick and heavy so that when in use it can function to prevent an uneven motion between the consecutive explosions.

Integral with the rim of the wheel 20 are hollow abutment cup-shaped housings 26 that are spaced an equal distance apart and preferably there are four of them. These abutment housings intermittently and consecutively in combination with the stationary channeled housing 27 and rotary abutment 28 on shaft 17 form a succession of single temporary combustion chambers 29 in which charges of explosive mixture are ignited to develop the thrust or expansive power for rotating the power wheel and drive shaft.

The housings 26 are cup-shaped to prolong the periods of expansion in the channeled housing so that a greater power can be developed with a relatively small consumption of fuel.

In other words the housing 27 and abutment 28 are arranged so that when any of the movable housing members 26 is in the position of the upper one shown in Fig. 2, the combustion chamber 29 will be entirely closed and complete except charging passage 130 controlled by the inlet valve 30. When the chamber 29 is closed by the members or parts 26, 27 and 28, it is charged with a combustible mixture under sufficient pressure to explode when ignited, as hereafter explained.

This mixture is delivered under pressure to the chamber 29 through a supply pipe 31, see Fig. 5. This pipe has its discharge end packed in one end of the shaft 16 so the latter can rotate without turning the pipe, as best shown in Fig. 5. The means for supplying the pipe 31 with fuel under pressure is not shown as it is old in the art and forms no part of this invention.

From the pipe 31 the mixture is delivered to a chamber 32 in the hub 21 through the passage 33 and ports 34. From the chamber 32 the mixture passes through the pipes 35 to the fuel chambers 36 that are arranged in the rim of the fly wheel 20 under and adjacent the chamber 29 in the cup-shaped housings 26. The chambers 36 are connected to the chambers 29 in the housings 26 by the passages 130 which are normally closed by the valves 30.

The valves 30 are opened by a cam 37 secured to the frame 10. These valves are arranged to open the moment the chamber 29 is fully closed, and when the valves are open the chamber 29 will be charged with the mixture as stated. The valves 30 are closed after the chamber 29 is charged by means of the springs 38 that act the moment the roller end 39 of the valve stem 40 disengages the cam 37.

Each of the housings 26 is provided with spark plugs 41 that act to ignite the charge in the chamber 29 when their respective contact 42 engages the spring contact 43 on the frame 10, see Fig. 5. This contact through the wire 44 receives sufficient electric current from a supply not shown to ignite the charges in the chamber 29 when engaged by any of the contacts 42.

The respective contacts 42 are connected by wires 45 to their respective spark plugs 41 and the wires 45 can be properly insulated by extending them through the insulating tubes 46 that are extended from the rim of the wheel 20 down through its web to the insulated contacts 42 with the wires 45 imbedded in the tubes so as to properly connect the spark plugs and contacts. Such wiring is old and well understood in the art and is, therefore, not shown or described in complete detail.

When the chamber 29 is charged and the mixture ignited the power developed by expansion of the burning mixture will practically all be applied toward rotating the wheel 20, as the thrust of expansion is against the periphery of the unyielding abutment 28 and the rear wall 47 of the yielding housing 26, thereby causing the wheel to rotate. The abutment 28 is rotated against the thrust of expansion, and as the wheel 20 is free to move except as to the slight friction on its bearings and the load on the sprocket 48 on shaft 16 substantially all of the power of expansion will be utilized to rotate the wheel 20 and shaft 16.

As previously indicated the rim of the wheel 20 is relatively thick and heavy so that after being rotated by the expansion of ignited gases in the chambers 29 it also acts as a fly wheel to aid in applying a continuous rotary power to the shaft 16. In other words, the heavy fly wheel prevents jerky motion of the parts between the periods of combustion.

The shaft 16, as indicated in Fig. 1, carries the sprocket wheel 48 from which power can be transmitted to other mechanism not shown, or if desired the shaft 16 can be provided with a pulley 100 as shown in Fig. 9, so it can drive machinery through a belt not shown.

Also secured to the shaft 16 is a bevel gear 49 that is in driving connection with the shaft 17 through jack shafts 50, 51, bevel gears 52, 53, 54 and spur gears 55, 56 diagrammatically indicated in Figs. 1, 3 and 9. The jack shafts 50 and 51 are secured to the frame 10 by bearing shafts 57 and 58, as best shown in Figs. 1 and 9.

Through the gear and shaft connection just described the shaft 16 rotates the shaft 17 so as to rotate the power wheel 20 in a ratio of one revolution to four revolutions of the abutment wheel 28. The wheel 28 is cut away at 128 to form for a part of its revolution a clearance for the housing 26 to pass under it and into the housing 27. The concentric periphery 228 of the wheel 28 is concentric with the curved face 127 of the housing 27 and they are engaged while a charge of mixture is trapped and being ignited and exploded in the chamber 29.

In Fig. 9 we show two power wheels instead of one, it being understood that other power wheels can be added if desired. The power wheel 20 and its abutment wheel 28 are arranged so the expansion periods in the combustion chambers as consecutively formed are forty-five degrees in advance of the expansive periods in said chambers formed by wheel 120 and its abutment 328. By this construction and arrangement of parts the power of the engine is practically doubled.

In operation a combustible mixture is supplied to the combustion chamber 29 and ignited as fully described hereinbefore. When the charges are ignited expansion will rotate the power wheel 20 as stated, and the heavy rim acts as a fly wheel to impart a smooth continuous rotation to the engine shaft.

We claim as our invention:

1. An internal combustion engine including a frame, a stationary channeled housing secured thereto, a shaft secured to said frame, a combined power and fly wheel secured to said shaft and arranged so its rim can pass through said housing, an abutment housing integral with the rim of said wheel that is cup-shaped to prolong the period of expansion while passing through said channeled housing, a rotary abutment for closing one end of said channeled housing when said abutment housing has entered therein, a thick rim to said wheel having fuel chambers therein arranged adjacent to said abutment housings, means for supplying fuel to said chambers and transferring it to a temporary combustion chamber formed between said rotary abutment and said abutment housings, said heavy rim adapted to steady the rotation of said wheel between its periods of combustion.

2. An internal combustion engine including a frame, a stationary channeled housing secured thereto, a shaft, a combined power and fly-wheel secured to said shaft, abutment housings integral with the rim of said wheel that are arranged to pass through said channeled housing when said wheel is rotated, a rotary abutment driven by said power wheel and having a peripheral portion adapted for a period during its revolution to engage and close one end of said stationary channeled housing as the other end thereof is closed by said abutment housings to form a temporary combustion chamber between said rotary and abutment housings, and means for charging and igniting charges of fuel in said temporary combustion chambers as they are formed.

3. An internal combustion engine including a frame, a stationary channeled housing secured thereto, a shaft, a combined power and fly-wheel secured to said shaft, abutment housings integral with the rim of said wheel that are arranged to pass through said channeled housing when said wheel is rotated, a rotary abutment driven by said power wheel and having a peripheral portion adapted for a period during its revolution to engage and close one end of said stationary channeled housing as the other end thereof is closed by said abutment housings to form a temporary combustion chamber between said rotary and abutment housings, means for supplying charges of fuel through said engine shaft to said temporary combustion chambers as they are formed, and spark plugs carried by said abutment housings for igniting said charges of fuel, said housings being cup-shaped to prolong the period of expansion within said channeled housing.

4. An internal combustion engine including an open frame, a hollow shaft rotatably mounted thereon, a rotary fly wheel secured to said shaft, spaced cup-shaped housings integral with the rim of said wheel that have chambers therein that are normally open to the outer air, an open ended channeled housing secured stationarily on said frame through which said cup-shaped housings pass when said fly wheel is rotated, an abutment arranged on said frame above and rotated by said fly-wheel and located in the same plane and having a peripheral portion adapted for a period during its revolutions to engage and close one end of said channeled housing as each cup-shaped housing has entered but before it has left the channeled housing, forming thereby successive temporary combustion chambers, fuel chambers in the rim of said fly-wheel arranged under said cup-shaped housings, means whereby fuel is delivered to said temporary combustion chambers through said hollow shaft and said fuel chambers, a spark plug in the advanced end of each cup-shaped housing, other means including electrical contacts on and movable with said wheel through which electrical current can be supplied to said spark plugs in a timed order of forming and charging said temporary combustion chambers, and stationary electrical contacts on said frame that are intermittently and successively engaged by the electrical contacts on said wheel when the latter is rotated, whereby electrical current can be supplied to said spark plugs for the purpose specified.

THOMAS H. RICHTER.
WALTER E. RICHTER.